United States Patent
Coulmeau et al.

(10) Patent No.: US 8,509,966 B2
(45) Date of Patent: Aug. 13, 2013

(54) METHOD OF ESTIMATING ATMOSPHERIC DATA AT ANY POINT OF A PATH OF AN AIRCRAFT

(75) Inventors: Francois Coulmeau, Seilh (FR); Guilhem Putz, Toulouse (FR); Olivier Friedmann, Toulouse (FR)

(73) Assignee: Thales, Neuilly sur Seine (FR)

(*) Notice: Subject to any disclaimer, the term of this patent is extended or adjusted under 35 U.S.C. 154(b) by 1139 days.

(21) Appl. No.: 12/358,853

(22) Filed: Jan. 23, 2009

(65) Prior Publication Data
US 2009/0204277 A1    Aug. 13, 2009

(30) Foreign Application Priority Data
Jan. 25, 2008 (FR) ..................... 08 00399

(51) Int. Cl.
| | | |
|---|---|---|
| G01C 23/00 | (2006.01) | |
| G05D 1/00 | (2006.01) | |
| G05D 3/00 | (2006.01) | |
| G06F 7/00 | (2006.01) | |
| G06F 17/00 | (2006.01) | |
| G01W 1/00 | (2006.01) | |

(52) U.S. Cl.
USPC .......................... 701/3; 73/170.16

(58) Field of Classification Search
USPC ............. 73/170.16, 170.01–170.02; 701/3, 701/7, 10, 14, 492, 497, 1; 244/75–99.91; 342/26; 374/109, 143
See application file for complete search history.

(56) References Cited

U.S. PATENT DOCUMENTS

| | | | | |
|---|---|---|---|---|
| 5,051,910 | A * | 9/1991 | Liden | 701/465 |
| 5,979,234 | A * | 11/1999 | Karlsen | 73/170.13 |
| 6,134,500 | A * | 10/2000 | Tang et al. | 701/528 |
| 6,184,816 | B1 * | 2/2001 | Zheng et al. | 342/26 R |

(Continued)

FOREIGN PATENT DOCUMENTS

| | | |
|---|---|---|
| DE | 3126891 A1 | 1/1983 |
| WO | WO 2004092767 A1 * | 10/2004 |

OTHER PUBLICATIONS

Yilmaz et al, A Statistical Approach to Estimate the Wind Speed Distribution: The Case of Gelibolu Region, Dogus Universitesi Dergisi, 9 (1) 2008, 112-132).*

(Continued)

*Primary Examiner* — Khoi Tran
*Assistant Examiner* — Abby Lin
(74) *Attorney, Agent, or Firm* — Baker & Hostetler, LLP

(57) ABSTRACT

The subject of the present invention is a method of estimating, at any point of a path of an aircraft, characteristics of the wind making it possible to take very close account of the winds to construct predictions of the times of passage and of the consumption of the aircraft along its flight plan, and this method is characterized in that it consists in collecting, around the trajectory of the aircraft, a grid of parameter values of winds at a predetermined number of points in space, in comparing these values to those deriving from space-time wind trend models, in selecting, path section by section, the most likely model, and in interpolating, for each section, the local characteristics of the wind of all the points of interest of the trajectory.

12 Claims, 7 Drawing Sheets

(56) References Cited

U.S. PATENT DOCUMENTS

| | | | |
|---|---|---|---|
| 6,552,669 B2 * | 4/2003 | Simon et al. | 340/945 |
| 6,600,991 B1 | 7/2003 | Jardin | |
| 6,895,335 B2 * | 5/2005 | Archibald et al. | 702/2 |
| 7,129,857 B1 * | 10/2006 | Spirkovska | 340/971 |
| 2004/0078136 A1 | 4/2004 | Cornell et al. | |
| 2004/0153218 A1 * | 8/2004 | Lohmiller | 701/3 |
| 2006/0235581 A1 * | 10/2006 | Petillon | 701/3 |
| 2007/0069941 A1 * | 3/2007 | Pearlman et al. | 342/26 B |
| 2007/0179703 A1 * | 8/2007 | Soussiel et al. | 701/200 |
| 2007/0215745 A1 * | 9/2007 | Fleury et al. | 244/2 |
| 2008/0243319 A1 * | 10/2008 | Coulmeau et al. | 701/14 |

OTHER PUBLICATIONS

Ali Naci Celik, A statistical analysis of wind power density based on the Weibull and Rayleigh models at the southern region of Turkey, Renewable Energy 29 (2003) 594-604.*

Gil Nachmani, Minimum-Energy Flight Paths for UAVs Using Mesoscale Wind FOrecasts and Approximate Dynamic Programming, Thesis, Dec. 2007.*

Ali Naci Celik, A statistical analysis of wind power density based on the Weibull and Rayleigh models at the southern region of Turkey, Renewable Energy 29 (2003), pp. 594-604.*

Ziad Hatahet, Wind Data Analyzer, Internship Report at Hochscule Wismar, Germany, Mar. 2006.*

* cited by examiner

SPATIAL WIND DISTRIBUTION MODEL SHOWING A WIND THAT ROTATES ANTICLOCKWISE AROUND A CENTRE

SPATIAL WIND DISTRIBUTION MODEL SHOWING A WIND BOUNDARY

METHOD OF ESTIMATING ATMOSPHERIC DATA AT ANY POINT OF A PATH OF AN AIRCRAFT

CROSS-REFERENCE TO RELATED APPLICATIONS

This application claims priority to French application no. 0800399, filed Jan. 25, 2008, the contents of which is hereby incorporated by reference in its entirety.

FIELD OF THE INVENTION

The present invention relates to a method of estimating atmospheric data at any point of a path of an aircraft.

BACKGROUND OF THE INVENTION

On board many aircraft, the FMS (Flight Management System) fulfils, among other things, the function of predicting the progress of a flight plan, which involves predictions, at each point of this flight plan, of the times of passage and of the speeds, as well as of the fuel consumed. These predictions are, however, extremely dependent on the winds encountered and therefore on the modelling of these winds.

The wind database on board aircraft can be obtained from two potential sources: on the one hand, from meteorological stations on the ground providing a service that can cover the entire earth but often with a poor sampling (in space and time) with respect to the requirements of the FMS, and on the other hand, the onboard meteorological functions provided by the ISS system and involving a meteorological radar. The latter data have the advantage of being very well sampled, but are valid only in the immediate environment of the aircraft, and over a limited time horizon.

The diagram of FIG. 1 represents an example of wind measurements supplied by a meteorological station on the ground. In this figure, the directions and intensities of the wind are represented at a few points in space, and in the present case, at four points A, B, C and D only, which, as specified above, constitutes an excessively low spatial sampling.

The complementary nature of the information supplied by the two abovementioned sources does not, however, mitigate the weakness of the sampling in space and time of the winds when considering points distant from the aircraft.

SUMMARY OF THE INVENTION

The subject of the present invention is a method of estimating, at any point of a path of an aircraft, atmospheric data, making it possible to take very close account of these data to construct predictions of the times of passage and of the consumption of the aircraft along its flight plan.

The method according to the invention is a method of estimating, at any point of a path of an aircraft, atmospheric data characteristics, and it is characterized in that it consists in collecting, around the trajectory of the aircraft, a grid of parameter values of these data at a predetermined number of points in space, in comparing these values to those deriving from space-time trend models of these data, in selecting, path section by section, the most likely model, and in interpolating, for each section, the local characteristics of these data for all the points of interest of the trajectory, and in evaluating the value of these data at any point in space, by using the most likely model.

BRIEF DESCRIPTION OF THE DRAWINGS

The present invention will be better understood from reading the detailed description of an embodiment, taken by way of nonlimiting example and illustrated by the appended drawing, in which.

DETAILED DESCRIPTION

The aim of the inventive method is to provide an estimation of the atmospheric data, and in particular of the wind, at any point in space. The detailed description below refers to the wind, but, obviously, it also applies to other atmospheric data such as temperature, humidity or atmospheric pressure. For this, two steps are carried out based on a set of data, such as those relating to FIG. 1, supplied for a given instant and for a given area of space.

First, the set of data is applied to different mathematical wind models. Among the various models available, the one that is most appropriate and that will be the interpolation model of the inventive method is selected.

Figure 2:
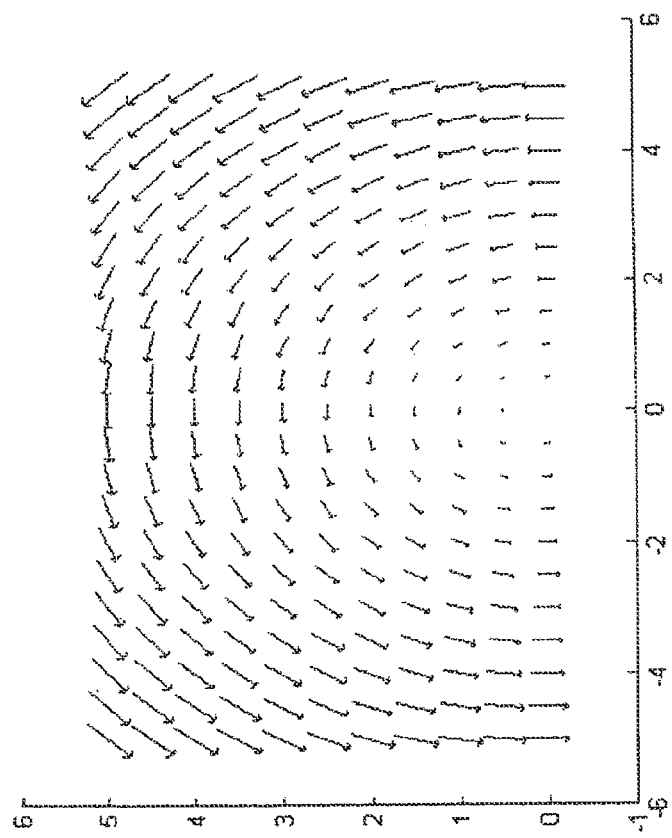
FIGS. 2 and 3 are diagrams of examples of spatial wind distribution models such as can be implemented by the method according to the present invention.
Figure 3:
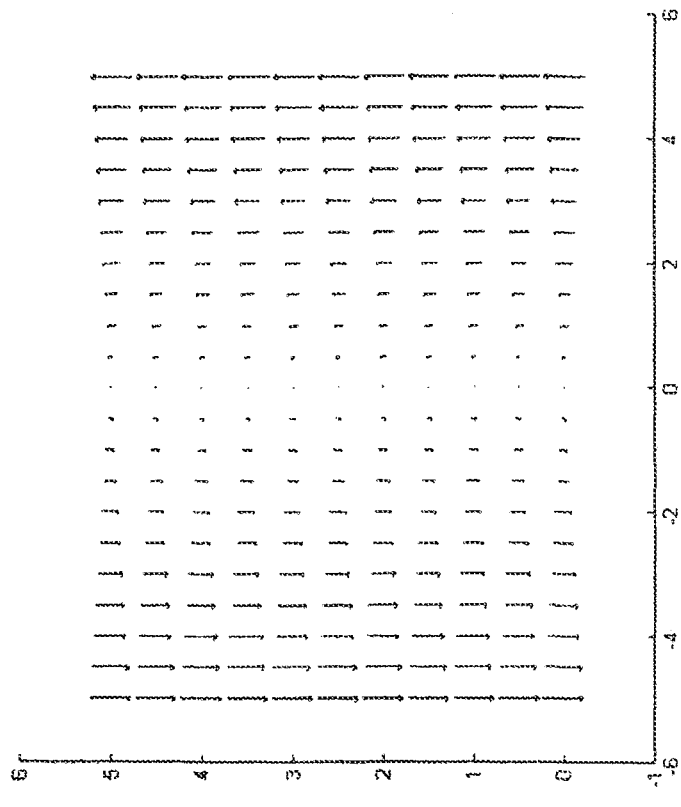

Step 1 consists in choosing the type of wind model to which the set of data corresponds. FIGS. 2 and 3 represent two winds of different types, but it is clear that, in reality, a larger number of wind models are used. The first model, in the example of FIG. 2, corresponds to a wind that rotates anticlockwise around a centre placed at the point (0,0). The second model (FIG. 3) corresponds to a wind boundary: downward winds in the lefthand half of the diagram and upward winds in the righthand half of the diagram. The values of the parameters of the wind in the different points of space change according to the model selected. The inventive method is capable of choosing from the models the one that best corresponds to the starting set of data.

In practice, it is assumed that there is a family of wind models available that corresponds to wind models that actually exist or that are deduced from measurements. Each of these wind models is a parametric or tabulated model. In the case of a parametric model, the intensity and the direction of the wind are a function of the coordinates 2D, 3D, 3D+(time) of the measurement points, as well as of other parameters $\alpha$, $\beta$, $\delta$ etc. determined in the manner described below.

Figure 1:
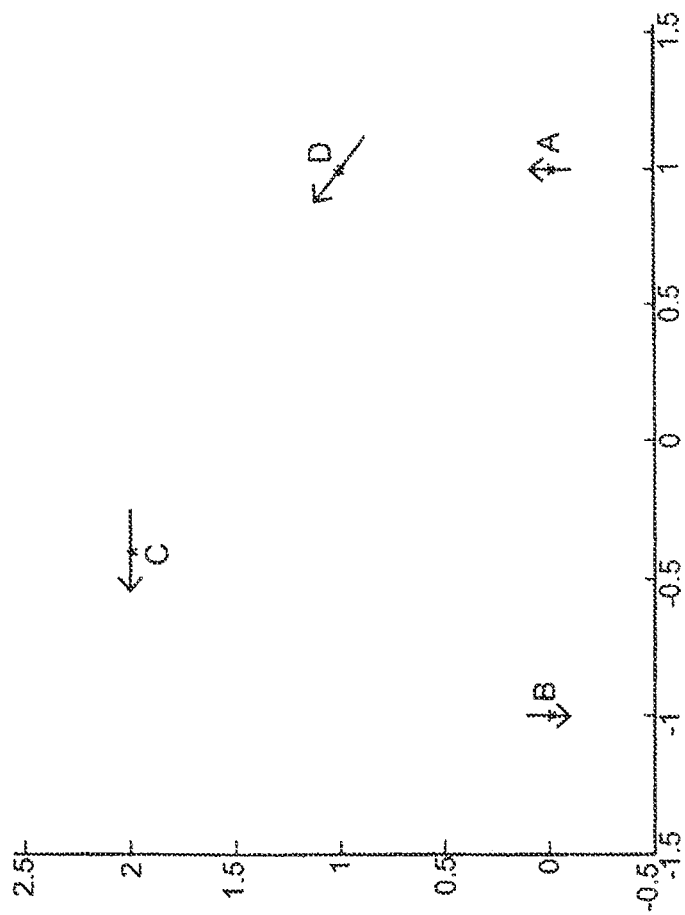
FIG. 1, already described above, is a diagram of a simplified example of wind measurements supplied by a meteorological station on the ground.

In the example of FIG. 1, the points A and B alone do not make it possible to determine whether it is a case of a revolving wind or of a wind changing direction. On the other hand, the point C, which is horizontal, and the oblique point D make it possible to assume that the wind is revolving. The step 1 will make it possible to gather the information making it possible to select the model in the step 2.

An example of parameterization of the revolving wind is described first. Take a point M in space, the polar coordinates of which are $(\rho,\theta)$ ($\rho$ being the distance from the point M to the point (O,O) and $\theta$ being the angle between OM and the x axis). The intensity of the wind $\rho_{wind}$ and its direction $\theta_{wind}$ as a function of $\rho$ and $\theta$ can take the form:

$$\theta_{wind} = \alpha*\theta + \beta$$

$$\rho_{wind} = \delta*\rho$$

For a wind changing direction, the parameterization can be, for example, produced as follows. Take a point M in space whose Cartesian coordinates are (x,y). Since the wind is vertical in this model, all that is needed is to know its speed $vy_{wind}$ in the vertical direction. The intensity $vy_{wind}$ as a function of x and y can take the form:

$$vy_{wind} = \gamma*x$$

In practice, the first step consists in estimating the different parameters $\alpha, \beta, \delta, \gamma$ etc. for each of the different models used. This estimation can be made according to a mathematical method such as the least squares method, or a statistical method.

For example, in the case of FIG. 1, the spatial coordinates of the points A to D and the coordinates of the wind vector associated with each of the points are:

Point A: coordinates of the point x=1, y=0 coordinates of the wind x=0.004 y=0.2
Point B: coordinates of the point x=−1, y=0 coordinates of the wind x=0 y=−0.2
Point C: coordinates of the point x=−0.4, y=2 coordinates of the wind x=−0.3 y=0
Point D: coordinates of the point x=1, y=1 coordinates of the wind x=−0.24 y=0.24
  (the norm of the wind vector sqrt(x*x+y*y)=wind force, and the arc tangent of y/x gives the direction).

By performing an estimation of parameters by the least squares method, the following are obtained:

Model of revolving wind: $\alpha=0.9928$, $\beta=1.5267$ and $\delta=0.1828$
  Model of wind changing direction: $\gamma=0.2025$ In the context of a tabulated modelling of the atmosphere, there are various tables available that contain unitary wind vectors. The wind measurement vectors (normed with a modulus of 1) are then compared to the various tables, possibly with interpolation. The result is a modelled matrix, containing the differences between the measurements and the model.

Step 2 of the inventive method consists in choosing the most appropriate model. Having completed the first step, equations with which to determine the wind values for each of the models at each point in space are available.

In practice, a cost function is defined, which makes it possible to evaluate the deviation between the wind values calculated for a model and the wind values existing in the knowledge database derived from the onboard models. The selected model will be the one that gives the lowest "cost", that is, the lowest error between the computed values and the database values. This cost function can, for example, be derived from statistical calculations (Khi 2 method for example).

Thus, in the example of FIG. 1, for the points A, B, C, D, the norm (for example the modulus) of the vector obtained by calculating the difference between the known wind vector and the interpolated wind vector is calculated. A vector of dimension N (N being the number of measurement points, in this case 4), containing the norms found is then created, and a norm f is calculated therefrom.

With a norm of order 2 (quadratic norm), the following are obtained:

Cost calculated for the rotating wind model: 0.1227
  Cost calculated for the wind changing direction model: 0.3945

The cost of the rotating wind model is three times less than that of the wind changing direction, so it is the rotating wind model that is the most likely.

To evaluate the wind at any point in space included in the space inside the measurement points, the "rotating wind" model is therefore used for the present example with the parameters found in the step 1.

The inventive method, which aims primarily to improve the predictions calculated along a flight plan, is advantageously implemented by an FMS which fulfils, among other things, prediction functions.

The FMS input data are then raw wind data. These data can be computed on the ground by meteorological stations, for example, or on board the aircraft by meteorological information processing equipment (for example, an Integrated Surveillance System ISS).

The ISS system meteorological functions, based on a meteorological radar, are more of the short-term type (the radar having a range of a few hundreds of nautical miles), whereas the data received from the ground can cover the entire earth (but are less accurate). The device implementing the inventive method therefore uses the ISS data for the flight plan part that is in radar range, and the data routed by data link or input by the pilot for the flight plan part out of radar range.

Figure 4:
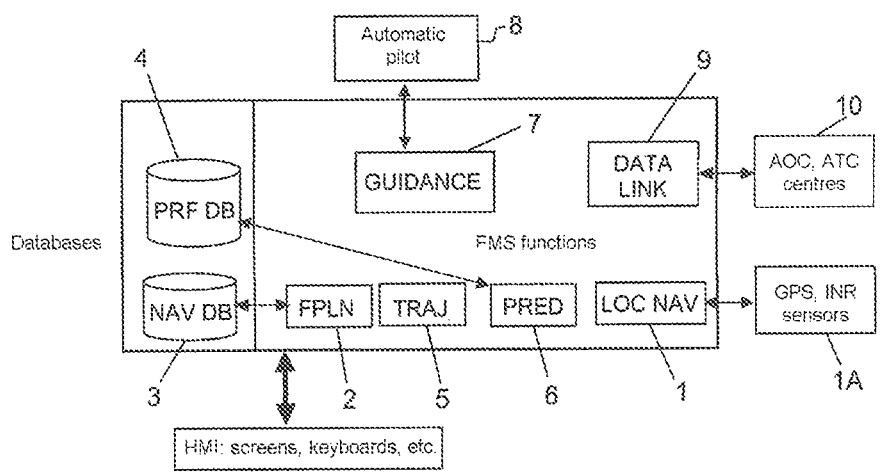
FIGS. 4 and 5 are simplified block diagrams of an example of FMS system and of an example of an Integrated Surveillance System (ISS) system, respectively, that can implement the inventive method.

The simplified block diagram of an aircraft flight management device (Right Management System FMS) in FIG. 4, which is provided with a human-machine interface HMI, represents the following functions of the FMS, described in the ARINC 702 standard (Advanced Right Management Computer System, December 1996). They normally handle all or some of the following functions:

Navigation LOCNAV, referenced 1, for optimally locating the aircraft according to geo-locating means (GPS, GALILEO, VHF radio beacons, inertial units, referenced 1A as a whole),
  flight plan FPLN, referenced 2, for inputting the geographic elements forming the outline of the route to be followed, namely: departure and arrival procedures, waypoints, airways),
  navigation database NAV DB, referenced 3, for constructing geographic routes and procedures from data included in the databases (points, beacons, interception or altitude "legs", etc.),
  performance database PRF DB, referenced 4, containing the aerodynamic parameters and those of the aircraft's engines,
  lateral trajectory TRAJ, referenced 5, for constructing a continuous trajectory from the points of the flight plan, observing the performance characteristics of the aircraft and the containment constraints (RNP);
  prediction function PRED, referenced 6, for constructing an optimized vertical profile on the lateral trajectory,
  guidance, GUID, referenced 7, for guiding, in the lateral and vertical planes, the aircraft on its 3D trajectory, while optimizing the speed, in conjunction with the automatic pilot 8,
  digital data link "DATALINK", referenced 9, for communicating with the control centres, referenced 10, and other aircraft.

Figure 5:
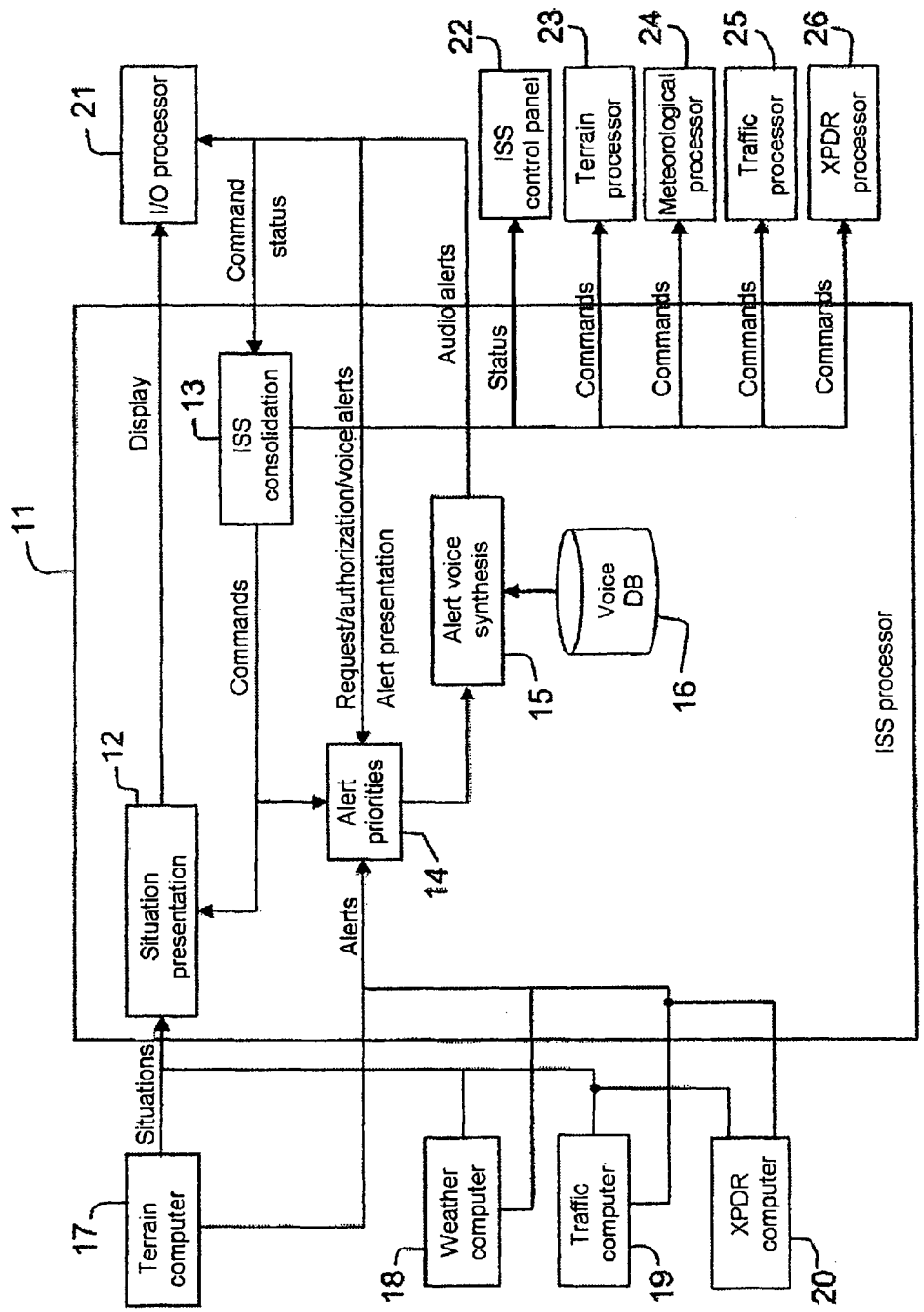

The block diagram of FIG. 5 schematically represents an Integrated Surveillance System (ISS) system. It primarily comprises a dedicated ISS processor 11. This processor 11 comprises the following elements: a device 12 for giving a detailed presentation of the surrounding situation, a device 13 for consolidating the ISS commands linked to the device 12 and to a device 14 for determining alert priorities, and an alert voice synthesis device 15 linked to a database 16 of voice messages.

The processor 11 receives the information from the following elements: a terrain data processor 17 supplying the device 12 with information on the situation of the ground close to the aircraft comprising this ISS system and alerts to the device 14, a meteorological processor 18, an air traffic processor 19 and an XDPR processor 20 (XPDR being a transponder, standardized equipment making it possible to receive and send digital data, currently deriving from surrounding aeroplanes or ground stations, including meteorological information). The processors 18 to 20 are each linked to the elements 12 and 14.

The output data of the processor 11 are sent by the elements 12, 13 and 15 as follows. The device 12 sends the data relating to the surrounding situation to a device 21 for processing input and output signals to and from the processor 11. The voice synthesis device 15 sends to the device 14 requests to authorize the emission of voice alerts. This device 14 determines the priority level of such alerts and, at the required moment, it authorizes the device 15 to emit these alerts that are sent to the device 21. The device 13 for consolidating ISS commands sends, on the one hand, ISS status information to an ISS control panel 22 and, on the other hand, it sends command signals to a terrain processor 23, to a meteorological processor 24, to an air traffic processor 25 and to an XDPR processor 26. The equipment items on the left and right of the diagram represent the same equipment, with, on the left (17 to 20), the "reception" and processing mode and, on the right (23 to 26), the "transmission" mode.

Figure 6:
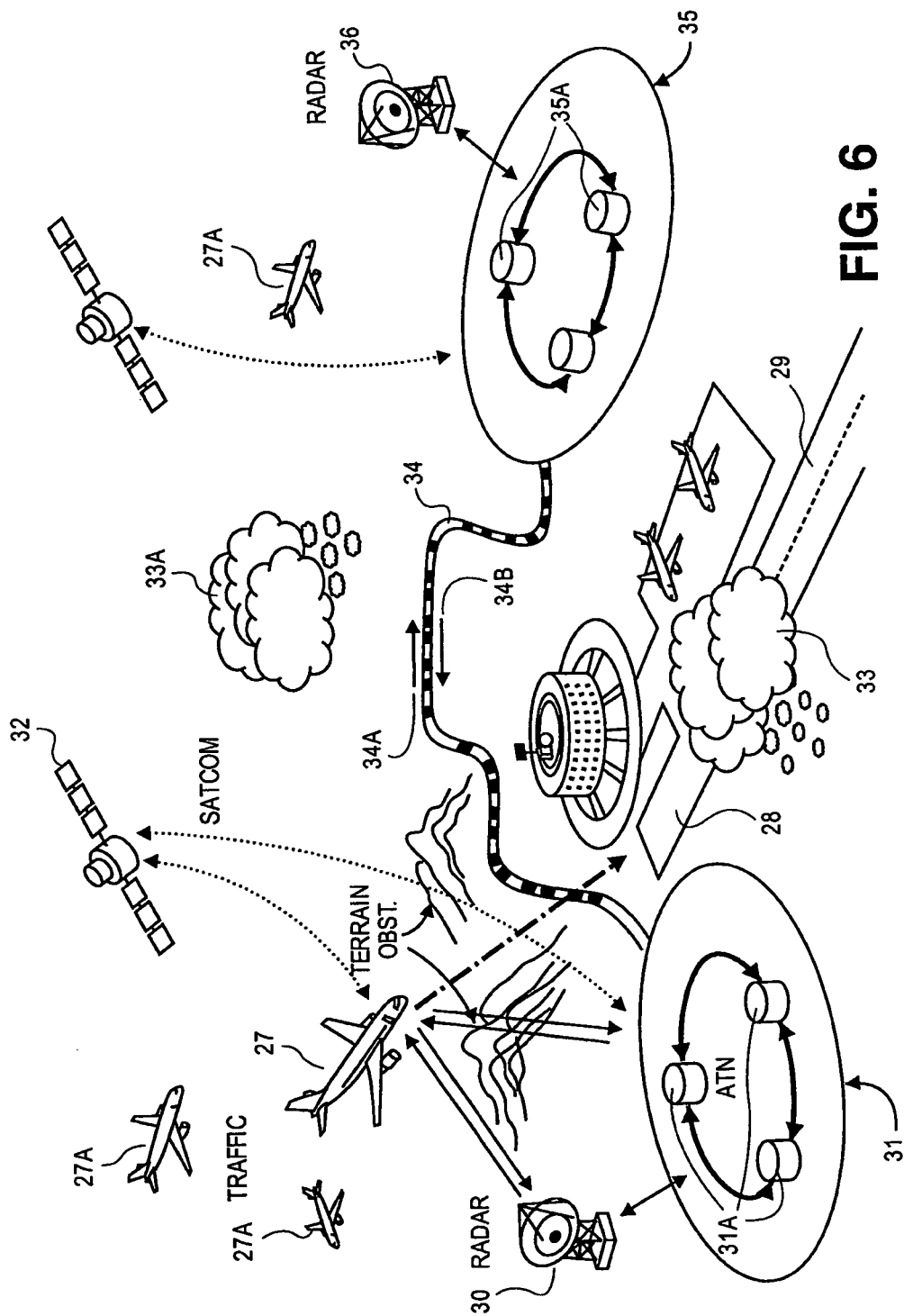
FIG. 6 is a schematic view of an area of the earth and of the surrounding space, an area in which the inventive method can be implemented.

FIG. 6 diagrammatically represents the "meteorological part" of the system implementing the inventive method and more particularly its ground stations. As detailed below, this system primarily comprises radars, communication systems (VHF, SATCOM, HF, etc.) and meteorological centres.

FIG. 6 shows an example of means used (in this case designated overall "ground meteorological segment" or, for short, "SMS") to implement the inventive method for an aircraft 27 in the phase of approach to the landing runway 28 of an airport 29, and, where appropriate, for other aircraft 27A located close to the airport 29. At least the aircraft 27 comprises equipment for implementing the inventive method. It is monitored by at least one secondary surveillance radar 30 and it communicates by VHF (by voice and by "DATALINK" type data exchange) with at least one of the air traffic control centres of a set 31 of air traffic control centres 31A that it is within range of, these centres being linked to the radar or radars 30 and to at least one communication satellite 32. The control centres 31A receive from the aircraft information relating to the surrounding meteorological conditions (as measured by its onboard measuring instruments), and in particular the stormy or strong wind generating formations (33), and retransmit them via an appropriate link 34A to a set 35 of meteorological stations 35A that are part, for example, of a national meteorology service. This set of stations comprises terminal meteorological observation stations and stations for processing information "en route" that reaches them via the links 34A. These stations 35 are, moreover, linked to meteorological radars (for example of the light detection and ranging (LIDAR—a laser teledetection system) type such as the radar 36 represented in the drawing and to the meteorological observation satellites such as the satellite 37, observing the meteorological conditions (33A) around the airport 29.

The meteorological information is taken into account as follows. Reference should now be made to FIGS. 5 and 6.

The FMS generates the flight plan (FPLN function) from information in the navigation database (NAV DB).

The FMS generates a first set of predictions 4D (TRAJ and PRED functions) from the flight plan, and of optimization and performance parameters deriving from information input by the pilot via the HMIs, and obtained from the company owning or chartering the aircraft (here referred to as company) via the data link and from aircraft performance characteristics (PERF DB). It uses an average wind speed entered by the crew or transmitted by the company.

The FMS sends the 3D outline (flight plan FPLN, trajectory TRAJ and predictions PRED) and the initial estimates of times of passage to the ISS and to the SMS.

The FMS then receives a set of meteorological data (for example: winds, temperatures, tropopauses), which are possibly a function of time, in the form of grids for example, of the ground along the flight plan and the WIMS function of the set 35.

If the meteorological radar of the aircraft is switched on, the FMS receives from the ISS (processor 18) wind speed and direction information, and, possibly, temperature and tropopause information along the trajectory, within radar range.

The FMS also receives in real time instantaneous measurements of temperature, wind, from sensors installed on the aircraft (ADC, IRS, GPS).

The FMS therefore uses the following data:
Measured data for the very short term
Radar data=short term
Ground segment data From the received data, the FMS refines its 4D predictions by using the inventive method, as described herein.

A few iterations may be necessary if the 4D flight plan deriving from this calculation is significantly different from the initial 4D flight plan.

As a variant, in other devices, the FMS sends the outline flight plan (FPLN) and the predictions to the ISS, and the latter is responsible for calculating and forwarding to the FMS the wind data around the flight plan at the predicted instants.

Similarly, the method implemented for modelling the wind can be extended likewise to other modellable meteorological data such as the temperature or humidity profile.

Figure 7:
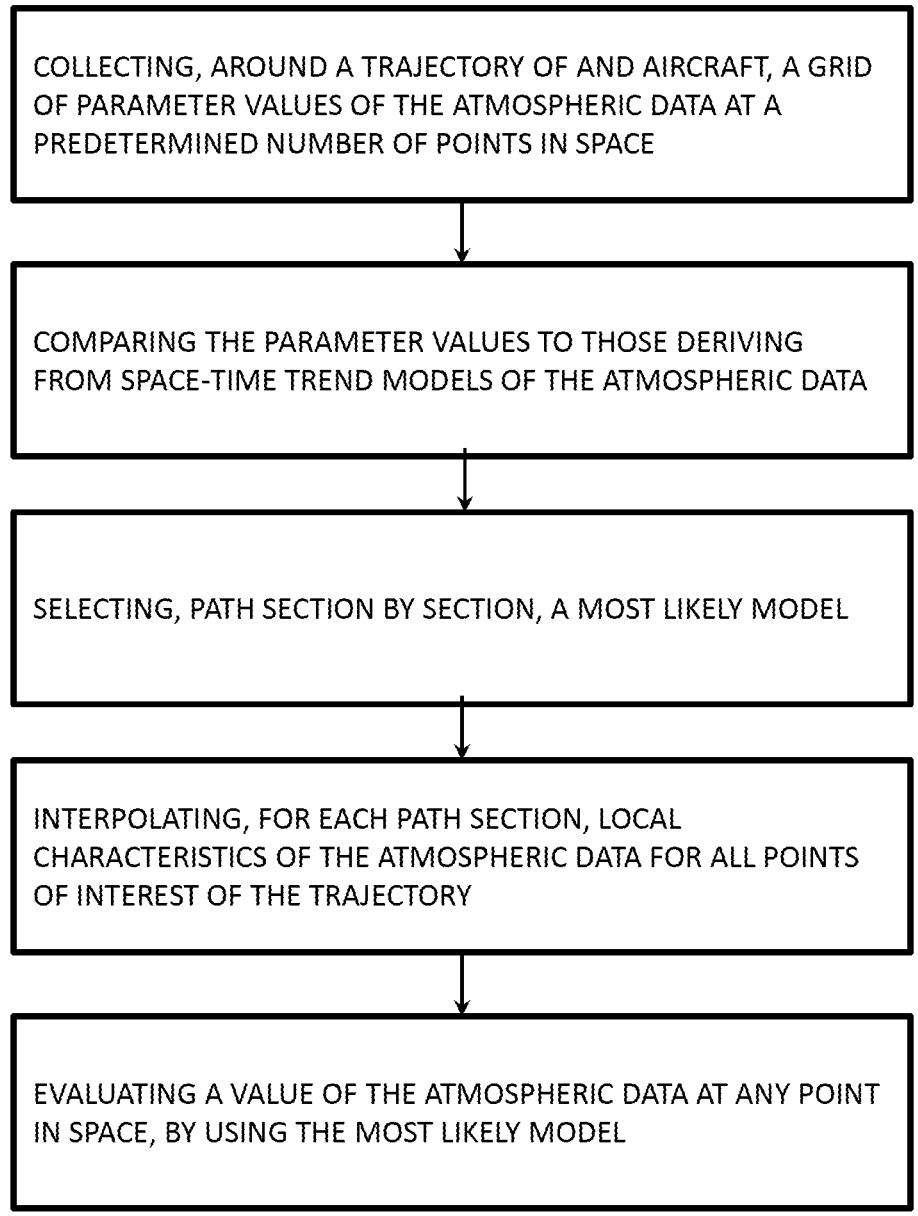
FIG. 7 shows the method according to the invention.

FIG. 7 shows a method of estimating, at any point of a path of an aircraft, atmospheric data characteristics, and it is characterized in that it consists in collecting, around the trajectory of the aircraft, a grid of parameter values of these data at a predetermined number of points in space, in comparing these values to those deriving from space-time trend models of these data, in selecting, path section by section, the most likely model, and in interpolating, for each section, the local characteristics of these data for all the points of interest of the trajectory, and in evaluating the value of these data at any point in space, by using the most likely model.

What is claimed is:

1. A method of estimating, at any point of a path of an aircraft, atmospheric data utilizing a flight management system, comprising:
    collecting with the flight management system, around a trajectory of the aircraft, a grid of parameter values of atmospheric data at a predetermined number of points in space,
    comparing with the flight management system said parameter values to values derived from a plurality of mathematically different space-time trend models of said atmospheric data, selecting with the flight management system, path section by section, a most likely model from the plurality of mathematically different space-time trend models, and interpolating with the flight management system, for each path section, local characteristics of said atmospheric data for all points of interest of the trajectory and evaluating a value of said atmospheric data at any point in space, by using the most likely model.

2. The method according to claim 1, wherein the atmospheric data is selected from the group consisting of wind, temperature, humidity, and atmospheric pressure.

3. The method according to claim 2, wherein the selection of the most likely model comprises estimating different parameters of the winds ($\alpha, \beta, \delta, \gamma \ldots$) for each of the plurality of mathematically different space-time trend models used according to a mathematical estimation method.

4. The method according to claim 3, wherein the mathematical estimation method is a least squares method or a statistical method.

5. The method according to claim 1, wherein the selection of the most likely model comprises estimating different parameters of the winds ($\alpha, \beta, \delta, \gamma \ldots$) for each of the plurality of mathematically different space-time trend models used according to a mathematical estimation method.

6. The method according to claim 5, wherein the mathematical estimation method is a least squares method or a statistical method.

7. A device for implementing the method according to claim 1, comprising:
a first computer including connected elements including
a flight management system (FMS) including at least one device for computing flight plans, a trajectory and predictions along said flight plans,
a device for collecting meteorological information, including
a second computer of an Integrated Surveillance System (ISS) type and at least one element selected from a group consisting of a terrain data processor, a meteorological processor, an air traffic processor, and a transponder processor.

8. A device for implementing the method according to claim 2, comprising:
a first computer including connected elements including
a flight management system (FMS) including at least one device for computing flight plans, a trajectory and predictions along said flight plans,
a device for collecting meteorological information, including
a second computer of an Integrated Surveillance System (ISS) type and at least one element selected from a group consisting of a terrain data processor, a meteorological processor, an air traffic processor, and a transponder processor.

9. A device for implementing the method according to claim 3, comprising:
a first computer including connected elements including
a flight management system (FMS) including at least one device for computing flight plans, a trajectory and predictions along said flight plans,
a device for collecting meteorological information, including
a second computer of an Integrated Surveillance System (ISS) type and at least one element selected from a group consisting of a terrain data processor, a meteorological processor, an air traffic processor, and a transponder processor.

10. A device for implementing the method according to claim 4, comprising:
a first computer including connected elements including
a flight management system (FMS) including at least one device for computing flight plans, a trajectory and predictions along said flight plans,
a device for collecting meteorological information, including
a second computer of an Integrated Surveillance System (ISS) type and at least one element selected from a group consisting of a terrain data processor, a meteorological processor, an air traffic processor, and a transponder processor.

11. A device for implementing the method according to claim 5, comprising:
a first computer including connected elements including
a flight management system (FMS) including at least one device for computing flight plans, a trajectory and predictions along said flight plans,
a device for collecting meteorological information, including
a second computer of an Integrated Surveillance System (ISS) type and at least one element selected from a group consisting of a terrain data processor, a meteorological processor, an air traffic processor, and a transponder processor.

12. A device for implementing the method according to claim 6, comprising:
a first computer including connected elements including
a flight management system (FMS) including at least one device for computing flight plans, a trajectory and predictions along said flight plans,
a device for collecting meteorological information, including
a second computer of an Integrated Surveillance System (ISS) type and at least one element selected from a group consisting of a terrain data processor, a meteorological processor, an air traffic processor, and a transponder processor.

* * * * *